United States Patent [19]

Christopulos

[11] Patent Number: 4,681,821

[45] Date of Patent: Jul. 21, 1987

[54] DUAL BATTERY CONNECTOR ARRANGEMENT

[75] Inventor: John A. Christopulos, Oakhurst, N.J.

[73] Assignee: The United States of America as represented by the Secretary of the Army, Washington, D.C.

[21] Appl. No.: 909,365

[22] Filed: Sep. 17, 1986

[51] Int. Cl.[4] ............................................. H01M 2/22
[52] U.S. Cl. ................................... 429/121; 429/123; 429/178; 439/627; 439/639
[58] Field of Search ................... 429/121, 122, 123, 1, 429/178, 179, 170, 101; 339/32 R, 29 B, 46, 184 M, 278 M, 276 C, 278 C, 61 M, 191 M, 152, 154 A

[56] References Cited

U.S. PATENT DOCUMENTS

| 2,159,042 | 5/1939 | Odell | 429/121 X |
| 2,225,460 | 12/1940 | Porth | 429/159 X |
| 2,229,377 | 1/1941 | Friang | 429/121 X |
| 4,064,328 | 12/1977 | Allen | 429/121 |
| 4,184,007 | 1/1980 | Urry | 429/178 X |
| 4,425,414 | 1/1984 | Solomon | 429/179 |

Primary Examiner—Anthony Skapars
Attorney, Agent, or Firm—Sheldon Kanars; Jeremiah G. Murray; John K. Mullarney

[57] ABSTRACT

A lithium-sulfur-dioxide battery (e.g., the BA5847/U) is modified so that it can be used both in its customary manner or as a substitute for a standard Leclanche battery (e.g., the BA210/U). Since the aforementioned batteries typically have their connectors at different, distinct locations, the first-mentioned battery is provided with a second set of connectors (i.e., female sockets) which are located at the very same position as the connectors of the battery it may be substituted for. Thus, this battery has two sets of (2-hole) connectors and these are, in turn, interconnected in parallel.

2 Claims, 5 Drawing Figures

DUAL BATTERY CONNECTOR ARRANGEMENT

The invention described herein may be manufactured, used and licensed by or for the Government for governmental purposes without the payment to me of any royalties thereon.

TECHNICAL FIELD

The present invention relates in general to batteries and, more particularly, to a dual (optional) battery connector arrangement which reduces proliferation.

BACKGROUND OF THE INVENTION

The military makes extensive use of the standard Leclanche (zinc-manganese-dioxide) BA210/U battery, produced by Union Carbide and others. This is a 6-volt, non-rechargeable battery which is used to provide power for test meters (e.g., ohm-meters), radio receivers, etc. For most purposes this battery has heretofore proven to be quite satisfactory. However, it is not without some shortcomings. For example, it has temperature range restrictions (i.e., 0°–125° F.); a current capability restriction (approximately 0.150 amperes); and a limited battery storage life ($\leq 2$ years).

A lithium-sulfur-dioxide battery similar in outward appearance in all respects to the BA210/U can, of course, be made for those field conditions, equipment requirements, and other situations where operative temperature range, current capacity and shelf storage life are important considerations. A lithium-sulfur-dioxide battery (e.g., BA5847/U) can provide operational capability to electronic equipment(s) at temperatures ranging from $-65°$ F. to 160° F., with a battery storage life at ambient conditions of five or more years. Also, the current capacity of the latter battery is substantial (e.g., 2 amperes).

To make an outwardly similar lithium-sulfur-dioxide battery as a substitute for the standard Leclanche BA210/U, for those situations that demand such a substitution, would result in undue proliferation. The BA5847/U is a commercially available lithium-sulfur-dioxide (6-volt) battery produced by Power Conversion Inc. and others. Unfortunately, the BA5847/U is different in outward appearance (e.g., connector location) from the Leclanche BA210/U and cannot be readily substituted for the latter; this will be evident to those skilled in this art.

SUMMARY OF THE INVENTION

It is the primary object of the present invention to reduce (battery) proliferation.

The above and other objects are achieved in accordance with the present invention by modifying a more versatile battery (e.g., the BA5847/U) so that it can be used both in its usual manner and/or as a substitute for another and different battery (e.g., the BA210/U). More specifically, since the aforementioned batteries typically have their connectors at different, distinctive locations on the (upper) surface of the respective batteries, the aforesaid versatile battery is provided with a second set of connectors (e.g., female sockets) which are located at the very same position as the connectors of the battery it may be substituted for. Thus, the versatile battery has two sets of (2-hole) connectors and these are, in turn, interconnected in parallel. Accordingly, this latter battery can be used in its customary manner and, when desired or necessary, it can be substituted for the other battery.

BRIEF DESCRIPTION OF THE DRAWINGS

The invention will be more fully appreciated from the following detailed description when the same is considered in connection with the accompanying drawings in which.

DETAILED DESCRIPTION

Figure 1A:
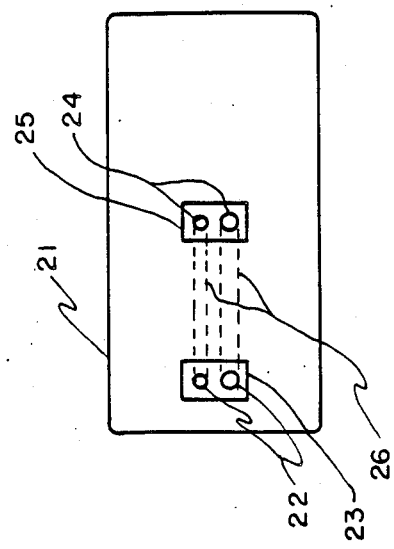
FIGS. 1A and 1B are elevation and top views of a prior art battery.
Figure 1B:
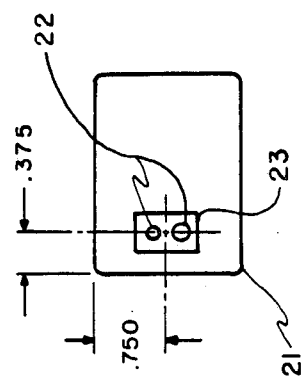

Turning now to FIGS. 1A and 1B of the drawings, there is shown a Leclanche BA210/U battery 11. This is a 6-volt non-rechargeable battery, with a current capacity of about 0.15 amperes. As previously noted, this is a commercially available item. The BA210/U battery is 2 and ⅝ inches by 2 and ⅝ inches, with a height of 3 and 27/32 inches. The battery connector(s) comprises a pair of female sockets or holes 12, the typical designation of the same being "MIL-B-18D(2-hole)type IV"; this designation is standard and is well known to those skilled in the art. The connector (sockets 12) is more-or-less centrally located on the upper or top surface of the battery.

Figure 2A:
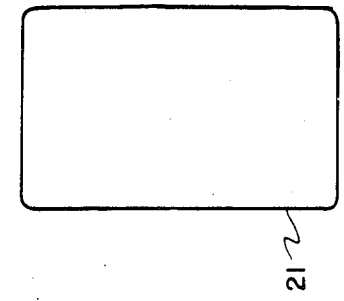
FIGS. 2A and 2B are elevation and top views of another prior art battery.
Figure 2B:
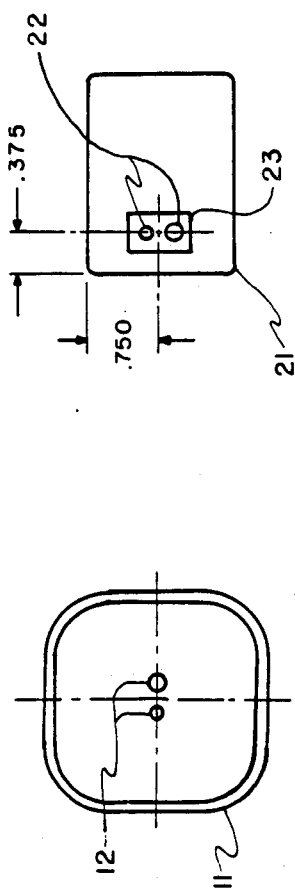

FIGS. 2A and 2B show a BA5847/U battery 21. This is a lithium-sulfur-dioxide battery, having the advantageous characteristics previously set forth. This also is a 6 volt non-rechargeable battery, but it has increased current capacity (2 amperes) and is approximately one-third the weight of the BA210/U battery. This also is a commercially available item. The BA5847/U battery is 1.50 inches by 2.550 inches, with a height of 3.750 inches. For present purposes, the heights of the respective batteries are unimportant. As will be noted in FIG. 2B, the connector (female sockets or holes 22) is positioned off-center; it also is an MIL-B-18D (2-hole) type IV connector. However, while the connectors of the FIG. 1 and 2 batteries are the same, it will be evident to those in the art that the FIG. 2 battery can not be readily substituted for the FIG. 1 battery. In this regard, it should perhaps be noted that the FIG. 1 battery (BA210/U) is typically received into a close-fitting compartment or well of the electronic equipment.

For clearance purposes, a small rectangular, slightly recessed, section 23 surrounds the connector sockets 22. Here again, however, this slight recess is unimportant for present purposes and can be disregarded.

Noting the dimensions of the previously discussed batteries and especially the (different) locations of their like connectors (both MIL-B-18D(2-hole)typeIV), it is the primary principle of the present invention that the more versatile BA5847/U battery be modified to include a second 2-hole type IV connector so that either connector of the BA5847/U may be selected as applicable to the equipment/situation requirements. This use of two (dual) connectors on the BA5847/U, both connectors wired in parallel, will thus permit this battery to be used in its customary manner or, alternatively, as a substitute for the BA210/U.

Figure 3:
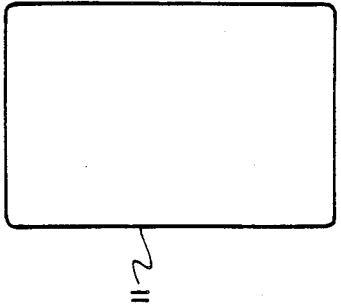
FIG. 3 is a slightly enlarged, top view of the FIG. 2 battery, as modified in accordance with the present invention.

Turning now more specifically to FIG. 3 of the drawings, a second connector (female sockets or holes 24) is centrally located on the upper or top surface of the battery 21. To facilitate manufacture of the battery this second connector will likewise be surrounded by a slightly recessed, rectangular section 25, which for present purposes can be disregarded. The pair of connectors 22 and 24 are electrically interconnected in parallel, as suggested by the dotted lines 26. This is readily accomplished during manufacture of the battery by plating two electrical stripes 26 on the underside of the top surface and between the connector sockets 22 and 24; see FIG. 3. The battery 21 can be readily accommodated by the equipment compartment or well which normally receives the BA210/U battery.

While specific batteries have been cited for disclosure purposes, it should be clear to those in the art that the principles of the invention have wider applicability. It is to be understood, therefore, that the foregoing disclosure relates to only a particular embodiment of the invention, and a specific use thereof, and that numerous modifications or alterations may be made therein without departing from the spirit and scope of the invention.

What is claimed is:

1. An arrangement for modifying a lithium-type battery so that it can be utilized in its customary manner or as a substitute for a Leclanche battery, said Leclanche battery being of predetermined dimensions and having a pair of female connection sockets substantially centrally located on the top surface thereof, said lithium battery being different predetermined dimensions than said Leclanche battery and having a pair of female connection sockets located at a predetermined off-center position on the top surface thereof, said lithium; battery also having a second pair of female connection sockets positioned on the top surface thereof and at a location which corresponds to the location of said connection sockets of the Leclanche battery, and a pair of electrical conductors plated on the underside of said top surface of said lithium battery, said electrical conductors serving to interconnect the two pairs of female connection sockets of said lithium battery in parallel.

2. An arrangement as defined in claim 1 wherein said Leclanche battery is typically received into a tight-fitting compartment or well, said lithium battery having dimensions that permit the same to also be received into said tight-fitting compartment.

* * * * *